US007525411B2

(12) United States Patent
Strader et al.

(10) Patent No.: US 7,525,411 B2
(45) Date of Patent: Apr. 28, 2009

(54) DOOR LOCK WITH PROTECTED BIOMETRIC SENSOR

(75) Inventors: Walter Strader, Coto De Caza, CA (US); Mark S. Bloom, Rancho Santa Margarita, CA (US); Gerald Chong, Rowland Heights, CA (US)

(73) Assignee: Newfrey LLC, Newark, DE (US)

( * ) Notice: Subject to any disclaimer, the term of this patent is extended or adjusted under 35 U.S.C. 154(b) by 639 days.

(21) Appl. No.: 11/247,654

(22) Filed: Oct. 11, 2005

(65) Prior Publication Data

US 2007/0080778 A1 Apr. 12, 2007

(51) Int. Cl.
*G06K 9/00* (2006.01)
*G06T 1/00* (2006.01)
*G06T 7/00* (2006.01)

(52) U.S. Cl. ..................... 340/5.53; 340/5.52; 340/5.82

(58) Field of Classification Search ................ 340/5.53, 340/5.52, 5.7, 5.82, 5.2; 382/115, 124
See application file for complete search history.

(56) References Cited

U.S. PATENT DOCUMENTS

| | | | |
|---|---|---|---|
| 6,595,342 B1 | 7/2003 | Maritzen et al. | |
| 6,865,913 B2 | 3/2005 | Yamagishi | |
| 7,023,319 B2 * | 4/2006 | Hwang | 340/5.53 |
| 7,242,276 B2 * | 7/2007 | Usui | 340/5.53 |
| 7,339,473 B2 * | 3/2008 | Lucas | 340/545.1 |
| 2003/0005336 A1 | 1/2003 | Poo et al. | |
| 2003/0005337 A1 | 1/2003 | Poo et al. | |
| 2003/0021495 A1 | 1/2003 | Cheng | |
| 2003/0023855 A1 | 1/2003 | Keogh et al. | |
| 2003/0101348 A1 | 5/2003 | Russo et al. | |
| 2003/0115475 A1 | 6/2003 | Russo et al. | |
| 2003/0115490 A1 | 6/2003 | Russo et al. | |
| 2003/0126448 A1 | 7/2003 | Russo | |
| 2003/0141959 A1 | 7/2003 | Keogh et al. | |
| 2003/0176218 A1 | 9/2003 | LeMay et al. | |
| 2003/0189480 A1 | 10/2003 | Hamid | |
| 2003/0189481 A1 | 10/2003 | Hamid | |
| 2003/0210131 A1 | 11/2003 | Fitzgibbon et al. | |
| 2004/0025550 A1 * | 2/2004 | Yamagishi | 70/278.1 |
| 2004/0177128 A1 | 9/2004 | Northway | |
| 2005/0077995 A1 | 4/2005 | Paulsen et al. | |
| 2005/0081302 A1 | 4/2005 | Elsener | |

FOREIGN PATENT DOCUMENTS

| | | |
|---|---|---|
| JP | 11315657 A * | 11/1999 |
| WO | WO 03/071470 | 8/2003 |

* cited by examiner

*Primary Examiner*—Abul Azad
*Assistant Examiner*—Michael Shannon
(74) *Attorney, Agent, or Firm*—Carlson, Gaskey & Olds PC

(57) ABSTRACT

A door lock is provided with a biometric sensor and a key cylinder. The biometric sensor is protected by being positioned on a shield, and such that the sensor is not exposed to damage by being on the front face of the door lock. The shield extends vertically downwardly from the remainder of the front face of the door lock, and the sensor is mounted to an inner face of the shield. Thus, the sensor is spaced away from a door when the door lock is mounted on a door. A finger may be inserted into a space between the sensor and the door, and the sensor can then capture information about the fingerprint. This information can be compared to expected fingerprints, and entry into a building can be granted based upon a recognition of this fingerprint.

9 Claims, 1 Drawing Sheet

DOOR LOCK WITH PROTECTED BIOMETRIC SENSOR

BACKGROUND OF THE INVENTION

This application relates to a door lock that utilizes either a mechanical key, or a biometric sensor to identify an authorized user, and wherein the biometric sensor is positioned to be between a shield on the door lock and the door, such that the sensor is protected.

Door locks are utilized to allow selective entry into a building. As is well known, door locks have traditionally included a mechanical key that moves a plurality of mechanical members to allow lock structure to turn and unlock a door. One known type of door lock is a deadbolt, wherein a key turns a rotating shaft to in turn actuate a deadbolt mechanism and either lock or unlock a door.

More recently, biometric sensors have been incorporated into doors. A biometric sensor is essentially a sensor that is able to identify an individual user based upon some trait of the user. Known types of biometric sensors use fingerprint recognition software, voice recognition software, etc. While biometric sensors have been proposed for use in door locks, they have typically been mounted into an outer facing surface of the door lock. A sensor on this surface would be unprotected, and subject to damage. In addition, a sensor in the outwardly facing surface would present aesthetic challenges to a designer of the door lock.

SUMMARY OF THE INVENTION

In a disclosed embodiment of this invention, a door lock is provided with a key cylinder and a biometric sensor. A portion of an outer holding structure for the key cylinder and the sensor has a shield providing a protective surface for the sensor. In one embodiment, the shield extends vertically downwardly from the key cylinder. The sensor is mounted to an inner face of the shield. A user would approach the door, and place a finger adjacent the sensor. The sensor would be able to sense the fingerprint, and communicate that information to a control. Should the fingerprint match a previously stored expected fingerprint, then the door may be opened.

The biometric software utilized to recognize fingerprints is as known in the art.

These and other features of the present invention can be best understood from the following specification and drawings, the following of which is a brief description.

DETAILED DESCRIPTION OF THE PREFERRED EMBODIMENT

Figure 1:
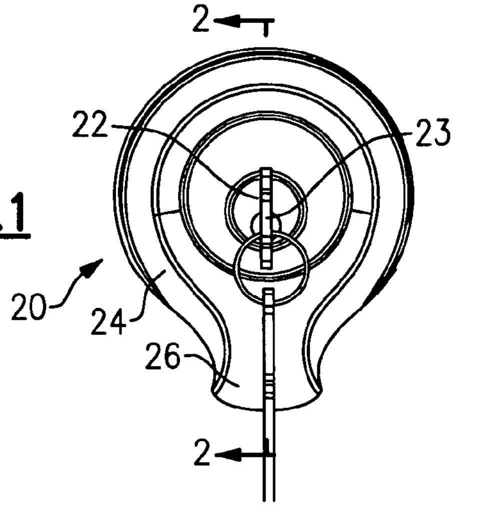
FIG. 1 is a front view of a door lock according to the present invention.

A door lock 20 is illustrated in FIG. 1 having an outer plate 24, and a shield 26 extending downwardly from a key cylinder 22. As shown, a mechanical key 23 is received within the key cylinder 22.

Figure 2:
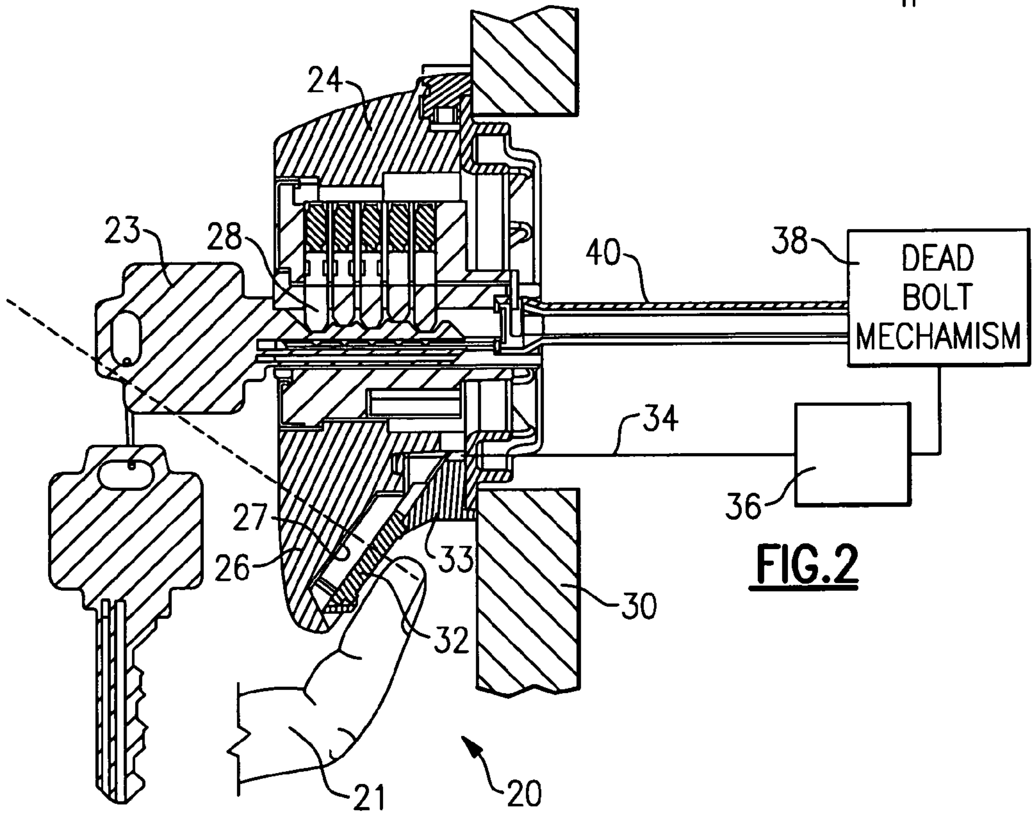
FIG. 2 is a cross-sectional view through the door lock of FIG. 1.

As can be appreciated from FIG. 2, the door lock 20 is mounted within a door 30. The key 23 actuates a plurality of mechanical pins 28, as known, to allow turning of a shaft 40 and actuation of a deadbolt mechanism 38. The shield 26 has an inner face 27 facing an outer face of the door 30. A sensor 32 is positioned on the shield. A plate mount 33 mounts the sensor to the shield 26. A wire harness 34 extends from the sensor 32 to a control 36. Control 36 also actuates the deadbolt mechanism 38.

As is known, the key 23 can be turned to actuate the deadbolt mechanism 38 and allow the door to be opened or locked. In addition, a user 21 may place a finger adjacent to the biometric sensor 32. The disclosed embodiment utilizes software wherein the finger can be merely swiped passed the sensor 32, and the sensor will capture at least a portion of the finger to compare it to stored fingerprints of authorized users. A sensing surface of the sensor faces an outer surface of the door. On the other hand, other types of software that take a complete snapshot of the finger, or some other form of biometric recognition can be utilized within this invention. That information is transmitted over the wire harness 34 to the control 36. If the information stored at the control 36 matches the fingerprint read by the sensor 32, then the deadbolt mechanism 38 can be opened. The means for storing authorized users in the control 36 may be as known in the art.

The finger of the user 21 is shown extending generally vertically upwardly in FIG. 2. This is, however, only to provide the simplest illustration. In many cases, the finger could simply enter the space from the side of the shield 26. The present invention also extends to this method of utilizing the biometric sensor to actuate a door lock.

The present invention places the biometric sensor 32 in a protected space between the shield 26 and the door 30, and ensures that the sensor will be better protected when compared to the prior art. In the prior art, the sensors have tended to be in the outer face of the lock, and could be damaged, such as by a misdirected key. In addition, by utilizing the shield 26 to conceal the sensor 32, the aesthetic qualities of the front face of the lock are improved compared to the prior art.

As can be seen, the biometric sensor 26 is placed on an outer surface of the shield 26, and facing the door 30. The shield 26 is formed at an outer peripheral surface of outer plate 24 to facilitate easy access to the protected space.

Figure 3:
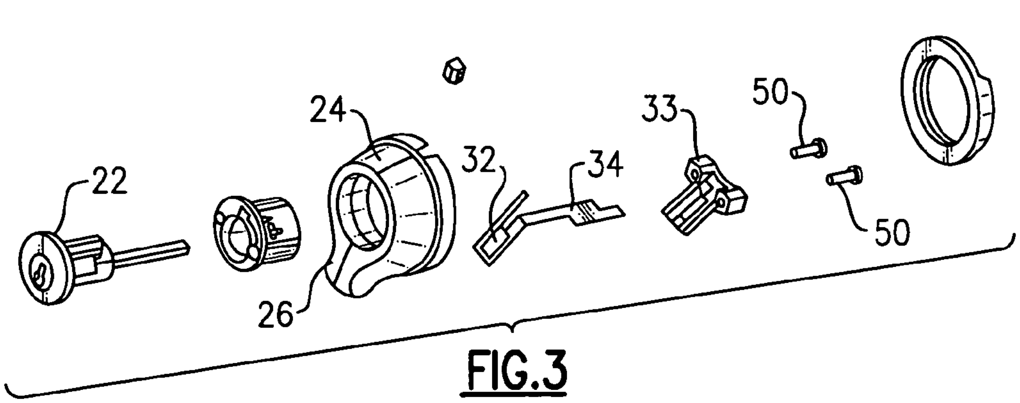
FIG. 3 is an exploded view of the FIG. 1 door lock.

FIG. 3 is an exploded view of the various components. As can be appreciated, the plate mount 33 for the sensor 32 is pinned or bolted to the shield 26 by pins 50.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A door lock comprising:

a key cylinder for receiving a mechanical key for actuating a lock mechanism;

a biometric sensor, said biometric sensor communicating with a control, said biometric sensor being operable to capture information and convey said captured information to said control, said captured information being compared to expected information at said control, and if said captured information and said expected information match, said control actuating said lock mechanism; and wherein a plate for mounting said key cylinder and said sensor to a door includes a shield, said shield extending away from a plate body to provide a protected mount surface for said biometric sensor, and said biometric sensor being mounted on an outer surface of said shield, and between said shield and the door when said door lock is mounted onto the door; and wherein said shield is spaced away from the door by a space such that said biometric sensor is spaced from the door by a space to provide access for a user; and wherein said shield extends vertically downwardly from said plate body.

2. The door lock as set forth in claim 1, wherein said biometric sensor is a fingerprint recognition sensor.

3. The door lock as set forth in claim 1, wherein a mount plate selectively mounts said biometric sensor to said shield.

4. The door lock as set forth in claim 1, wherein said biometric sensor extends to a wire harness, said wire harness communicating information from said sensor to said control.

5. The door lock as set forth in claim 1, wherein said shield extends from an outer periphery of said plate.

6. The door lock as set forth in claim 1, wherein said key cylinder includes a deadbolt lock, and said deadbolt lock being capable of being unlocked either by a mechanical key, or by the control and biometric sensor.

7. A door lock comprising:

a key cylinder for receiving a mechanical key for actuating a lock mechanism;

a biometric sensor, said biometric sensor communicating with a control, said biometric sensor being operable to capture fingerprint information about an individual attempting access to the door lock, and convey said captured information to said control, said captured information being compared to expected information at said control, and if said captured information and said expected information match, said control actuating said lock mechanism, and wherein a plate for mounting said key cylinder and said biometric sensor to a door includes a shield, said shield extending away from a plate to provide a protected mount surface for said biometric sensor, and said biometric sensor being mounted between said shield and the door when said door lock is mounted onto the door;

said shield being spaced away from the door by a space, and said biometric sensor mounted on an outer surface of said shield, such that said biometric sensor is mounted in a protected position; and said biometric sensor having a sensing face positioned to generally face an outer surface of the door when said door lock is mounted on the door; and wherein said shield extends vertically downwardly from a main body of said plate, such that said biometric sensor is accessible from a lower portion of the door lock.

8. The door lock as set forth in claim 7, wherein said shield extends from an outer periphery of said plate.

9. The door lock as set forth in claim 7, wherein said key cylinder includes a deadbolt lock, and said deadbolt lock being capable of being unlocked either by a mechanical key, or by the control and biometric sensor.

* * * * *